(12) United States Patent
Matthews (10) Patent No.: US 12,184,438 B2
(45) Date of Patent: *Dec. 31, 2024

(54) SYSTEM AND METHOD FOR CONTROLLING PLAYBACK OR RECORDING OF MEDIA ASSETS BASED ON A STATE OF A SECONDARY DEVICE

(71) Applicant: Adeia Guides Inc., San Jose, CA (US)

(72) Inventor: Sean Matthews, Los Altos, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,297

(22) Filed: Nov. 2, 2023

(65) Prior Publication Data

US 2024/0154837 A1 May 9, 2024

Related U.S. Application Data (63) Continuation of application No. 17/943,721, filed on Sep. 13, 2022, now Pat. No. 11,843,476, which is a continuation of application No. 17/210,997, filed on Mar. 24, 2021, now Pat. No. 11,477,045, which is a
(Continued)

(51) Int. Cl.
*H04L 12/28* (2006.01)
*H04N 21/2387* (2011.01)

(52) U.S. Cl.
CPC ...... *H04L 12/2814* (2013.01); *H04L 12/2803* (2013.01); *H04L 12/2812* (2013.01); *H04L 12/282* (2013.01); *H04L 12/2829* (2013.01); *H04N 21/2387* (2013.01)

(58) Field of Classification Search
CPC ............. H04L 12/2814; H04L 12/2803; H04L 12/2812; H04L 12/282; H04L 12/2829; H04N 21/2387; H04N 21/433; H04N 21/43

See application file for complete search history.

(56) References Cited

U.S. PATENT DOCUMENTS

| | | |
|---|---|---|
| 8,171,137 B1 | 5/2012 | Parks et al. |
| 10,152,537 B1 | 12/2018 | Kumar et al. |
| 10,263,802 B2 | 4/2019 | Burns et al. |

(Continued)

FOREIGN PATENT DOCUMENTS

EP 3739584 A1 11/2020

OTHER PUBLICATIONS

"Polling", Definition of "polling" from Wikipedia (Year: 2021), 2021.

*Primary Examiner* — Alina A Boutah
(74) *Attorney, Agent, or Firm* — Haley Guiliano LLP (57) ABSTRACT

Systems and methods are described herein for controlling playback and/or recording of media assets at a media device based on the state of a secondary device. Specifically, while displaying a media asset, a media device receives a signal from the secondary device indicating a change of state of the secondary device. The media device displays a notification of the signal, and the user can interact with the notification. If the user interacts with the notification for more than a threshold amount of time, the media device may begin recording the media asset. Once the user has finished interacting with the notification, the media device may stop recording and the user can see content that they may have missed by reviewing the recorded portion of the media asset.

20 Claims, 5 Drawing Sheets

Related U.S. Application Data continuation of application No. 16/222,774, filed on Dec. 17, 2018, now Pat. No. 10,992,490.

(56) References Cited

U.S. PATENT DOCUMENTS

| | | | |
|---|---|---|---|
| 10,462,551 B1 | 10/2019 | Kemmerer et al. | |
| 10,820,022 B1 | 10/2020 | Weil et al. | |
| 10,999,331 B1 | 5/2021 | Marchand et al. | |
| 11,546,951 B1* | 1/2023 | Siminoff | H04N 7/186 |
| 2003/0070182 A1 | 4/2003 | Pierre et al. | |
| 2005/0203647 A1* | 9/2005 | Landry | H04L 12/2818 |
| | | | 700/83 |
| 2008/0077705 A1 | 3/2008 | Li et al. | |
| 2008/0129498 A1 | 6/2008 | Howarter et al. | |
| 2014/0010515 A1 | 1/2014 | Lee et al. | |
| 2014/0013225 A1* | 1/2014 | Wu | G06F 3/0481 |
| | | | 715/716 |
| 2014/0108497 A1 | 4/2014 | Yao et al. | |
| 2014/0129012 A1 | 5/2014 | Ochi | |
| 2014/0176299 A1 | 6/2014 | Kumar et al. | |
| 2014/0207282 A1* | 7/2014 | Angle | B25J 13/006 |
| | | | 901/1 |
| 2014/0331133 A1 | 11/2014 | Coburn et al. | |
| 2015/0029880 A1* | 1/2015 | Burns | H04W 4/70 |
| | | | 370/252 |
| 2015/0149781 A1 | 5/2015 | Logue | |
| 2015/0264139 A1 | 9/2015 | Son et al. | |
| 2015/0319400 A1 | 11/2015 | Golyshko | |
| 2016/0055879 A1* | 2/2016 | Arai | H04N 21/4333 |
| | | | 386/201 |
| 2016/0286022 A1 | 9/2016 | Fukuda et al. | |
| 2016/0323482 A1 | 11/2016 | Chung | |
| 2016/0330182 A1* | 11/2016 | Jeon | A43B 3/34 |
| 2017/0055148 A1* | 2/2017 | Zimmerman | H04L 63/0428 |
| 2017/0063823 A1 | 3/2017 | Cheng et al. | |
| 2017/0118089 A1* | 4/2017 | Hur | H04W 52/0283 |
| 2017/0126774 A1 | 5/2017 | Woodman et al. | |
| 2017/0153681 A1 | 6/2017 | Chin et al. | |
| 2017/0171090 A1* | 6/2017 | Britt | H04L 47/2425 |
| 2017/0180803 A1 | 6/2017 | Lee et al. | |
| 2017/0244992 A1 | 8/2017 | Deshpande | |
| 2017/0310705 A1* | 10/2017 | Gopalakrishna | H04L 41/0886 |
| 2018/0120821 A1 | 5/2018 | Ayyagari et al. | |
| 2018/0213301 A1 | 7/2018 | Cheung et al. | |
| 2018/0288179 A1* | 10/2018 | Bhatia | H04L 45/645 |
| 2019/0090014 A1 | 3/2019 | Shoop | |
| 2019/0190992 A1* | 6/2019 | Warrick | H04L 67/125 |
| 2019/0207776 A1 | 7/2019 | Wang et al. | |
| 2019/0230414 A1 | 7/2019 | Deshpande | |
| 2019/0289069 A1 | 9/2019 | Cano Zapata et al. | |
| 2020/0099748 A1 | 3/2020 | Cambridge et al. | |
| 2021/0211321 A1 | 7/2021 | Matthews | |
| 2022/0019485 A1 | 1/2022 | Slovetskiy | |
| 2023/0006857 A1 | 1/2023 | Matthews | |

* cited by examiner

SYSTEM AND METHOD FOR CONTROLLING PLAYBACK OR RECORDING OF MEDIA ASSETS BASED ON A STATE OF A SECONDARY DEVICE

CROSS-REFERENCE TO RELATED APPLICATION

This application is a continuation of U.S. patent application Ser. No. 17/943,721, filed Sep. 13, 2022, which is a continuation of U.S. patent application Ser. No. 17/210,997, filed Mar. 24, 2021, now U.S. Pat. No. 11,477,045, which is a continuation of U.S. patent application Ser. No. 16/222,774, filed Dec. 17, 2018, now U.S. Pat. No. 10,992,490. The disclosures of each are hereby incorporated by reference herein in their entireties.

BACKGROUND

In the modern world of technology, many devices within a user's home are connected to local networks and/or the Internet, and can be controlled remotely through that connection. The devices within a user's home thus become part of an Internet-of-Things (IoT) environment. Devices within the IoT environment can exchange data with each other, and with a user. A user may also need to take an action in response to data received from an IoT device. In cases where a media device, such as a television, tablet, or mobile device, is part of a user's IoT environment, notifications from other IoT devices, and the user's need to respond, may interfere with the user's ability to watch media assets.

SUMMARY

Accordingly, systems and methods are described herein for controlling playback and/or recording of media assets at a media device based on the state of a secondary device. Specifically, while displaying a media asset, a media device receives a signal from the secondary device indicating a change of state of the secondary device, e.g., an IoT device such as a microwave, a laundry machine, the oven, and/or the like. The media device causes the display of a notification of the signal, e.g., in the form of a message widget having an interactive or selectable element providing options for the user to perform an action, and the user can interact with the notification. If the user interacts with the notification for more than a threshold amount of time, the media device may begin recording the media asset. Once the user has finished interacting with the notification, the media device may stop recording and the user can see content that he or she may have missed by reviewing the recorded portion of the media asset. The helps ensure that the user does not miss too much content of a streaming media asset while the user needs to shift his or her attention away from the media asset to take care of the second device, e.g., to turn off the oven, etc.

In some aspects, the media device receives a signal indicative of a state change of a secondary device from a first state to a second state. For example, a smart oven sends a signal indicating an amount of time left on a timer set of the oven. In some cases, the signal may include audio and/or video data. For example, a smart doorbell sends a signal indicating the someone has rung the bell, and transmits audio and video of the person who rung the bell.

The media device generates for display a notification of the signal. For example, the media device may generate an overlay for display over the media asset. The overlay may include an identification of the secondary device and a status of the secondary device corresponding to the current state of the secondary device. For example, the overlay may identify an oven and the amount of time remaining on a timer set on the oven, or may identify a doorbell and indicate that someone has rung the bell.

The media device receives input from a user input device to interact with the displayed notification. For example, where the media device is a tablet or mobile device, the user may interact with the notification using a touchscreen interface. If the media device is a set-top box, the user may interact with the notification using a remote control. In some embodiments, the user input device may be another IoT device or connected device, such as the user's mobile device, Amazon Echo, or Google Home.

In response to receiving the input, the media device stores a first time of receipt of the user input and determines, after a threshold amount of time, whether the secondary device is still in the second state. For example, the media device may receive user input to interact with the notification at 7:05:00 and records that time. After, for example, ten seconds, at a second time of 7:05:10, the media device determines if the smart oven is still reporting the time remaining on a timer, or if someone is still waiting outside the door after ringing the smart doorbell. If so, the media device buffers the media asset from at least the second time.

In some embodiments, the media device may pause playback of the media asset in response to receiving the user input to interact with the notification. For example, if a smart doorbell reports that someone has rung the bell, the media device may pause playback of the media asset in order to allow the user to hear what the person at the door is saying.

In some embodiments, when the media device determines that the secondary device is no longer in the second state, the media device generates options for display relating to the playback of the media asset. If the media device has recorded a portion of the media asset, an option to restart playback of the media asset from the second time is generated. If the media device has also paused playback of the media asset, an option to resume playback of the media asset at the current live point in the media asset is also generated.

In some embodiments, the media device determines whether the secondary device is still in the second state by monitoring transmissions from the user input device and determining if a transmission is addressed to the secondary device. For example, the media device may detect data packets from the user input device and access a header of each packet to identify the destination of the packet. If any packet is addressed to the secondary device, the media device determines that the user is still interacting with the secondary device and that the secondary device is still in the second state.

In some embodiments, the media device establishes a connection with the secondary device and with the user input device. For example, the media device may act as an IoT controller device and create a network including the media device, the secondary device, and the user input device. The media device receives the signal from the secondary device and the user input from the user input device via the established connections. The media device may, in some embodiments, create a direct connection between the secondary device and the user input device by bridging the established connections. The media device then relays data between the secondary device and the user input device via the direct connection.

In some embodiments, the media device receives, from the secondary device, audio and/or video data associated with the second state of the secondary device. For example, the secondary device may be a smart doorbell, which may transmit audio and video captured from a microphone and camera of the smart doorbell to the media device. The media device then outputs the received audio and/or video data.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for controlling playback and/or recording of media assets at a media device based on the state of a secondary device. Specifically, while displaying a media asset, a media device receives a signal from the secondary device indicating a change of state of the secondary device. The media device displays a notification of the signal, and the user can interact with the notification. If the user interacts with the notification for more than a threshold amount of time, the media device may begin recording the media asset. Once the user has finished interacting with the notification, the media device may stop recording and the user can see content that they may have missed by reviewing the recorded portion of the media asset. This helps ensure that the user does not miss any part of the media asset as a result of shifting his or her attention away from the media asset while interacting with the notification.

For example, the media device receives a signal indicative of a state change of a secondary device from a first state to a second state, such as a signal from a smart oven indicating an amount of time remaining on a timer set on the oven. In some cases, the signal may include audio and/or video data. For example, a smart doorbell sends a signal indicating the someone has rung the bell, and transmits audio and video of the person who rung the bell.

Figure 1:
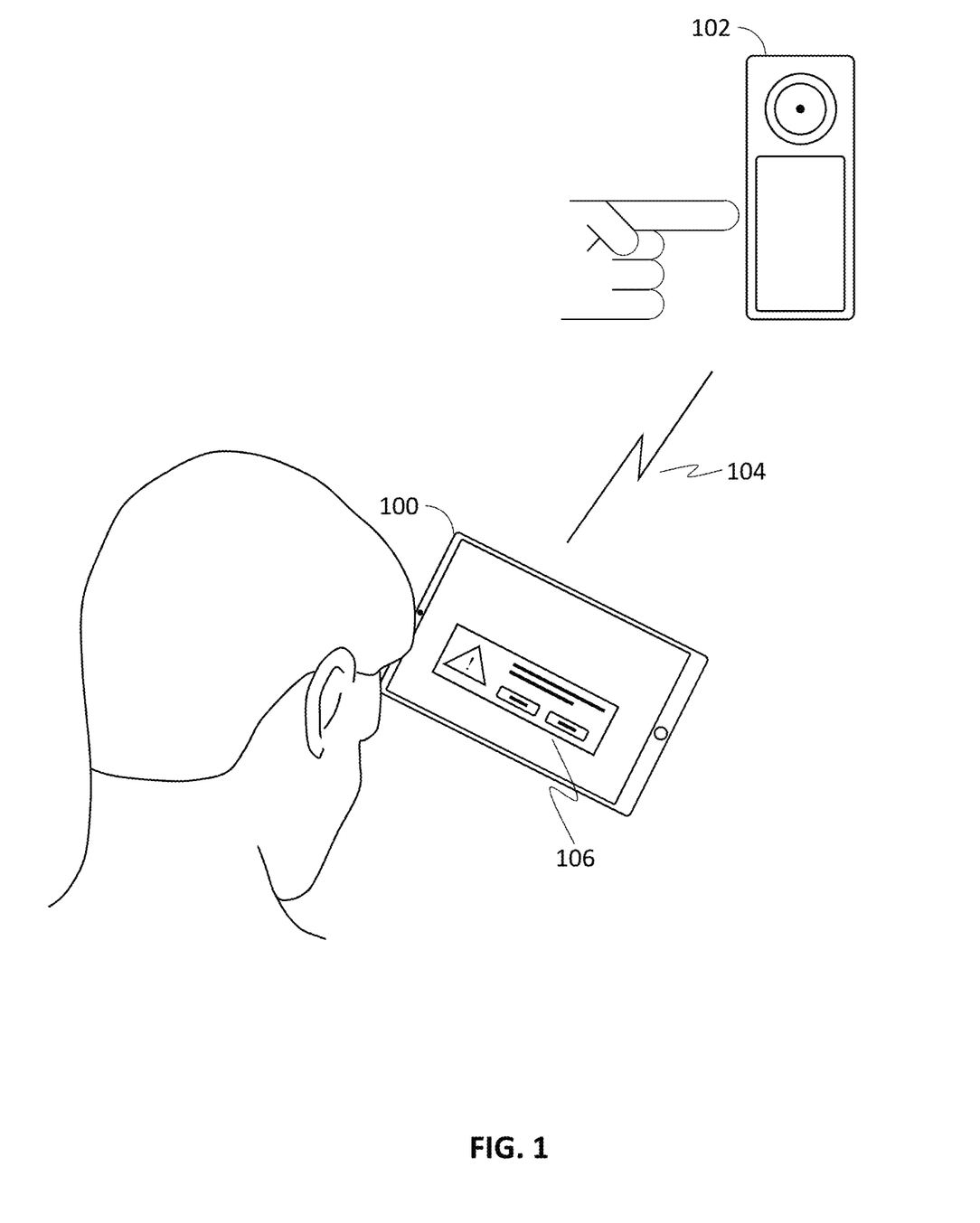
FIG. 1 shows a generalized embodiment of a media device receiving a signal from a secondary device indicating a change of state of the secondary device in accordance with some embodiments of the disclosure.

FIG. 1 is a generalized embodiment of a media device receiving a signal from a secondary device in accordance with some embodiments of the disclosure. Media device 100 may be a smartphone or other mobile device, a tablet, a personal computer, a smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a WebTV box, a personal computer television (PC/TV), a PC media server, a PC media center, a handheld computer, a stationary telephone, a personal digital assistant (PDA), a portable video player, a portable music player, a portable gaming machine, or any other device suitable for output of media assets. Secondary device 102 may be any device within the user's network capable of outputting a status signal or capturing audio or video input and transmitting the status signal or captured audio or video to another device in the network. For example, media device 100 may be a stereo system (e.g., Sonos) and secondary device 102 may be a user's smartphone which captures audio input from the user and transmits the audio to the stereo system. Other examples include a "smart" kitchen appliance transmitting audio of a timer notification to a set-top box or stereo system, a smoke alarm transmitting a siren or klaxon sound (along with verbal instructions such as evacuation routes), a smart doorbell transmitting audio and/or video of someone at the door, a motion detector transmitting a signal to a security camera to begin recording, and a parent transmitting a voice instruction from one device to a child using a second device. These examples are not limiting, and are provided for illustrative purposes only. For the purpose of this application, the example of a smart doorbell is used herein. The secondary device 102 transmits a signal 104 to the media device 100 indicating a state change of the secondary device. For example, when someone rings the doorbell, the smart doorbell 102 transmits a signal 104 to the media device 100 indicating that the state of the doorbell has changed from idle to active. The signal 104 may also include an identification of the doorbell 102, and may optionally include audio and/or video data captured by a microphone and/or camera of the doorbell 102.

Figure 2:
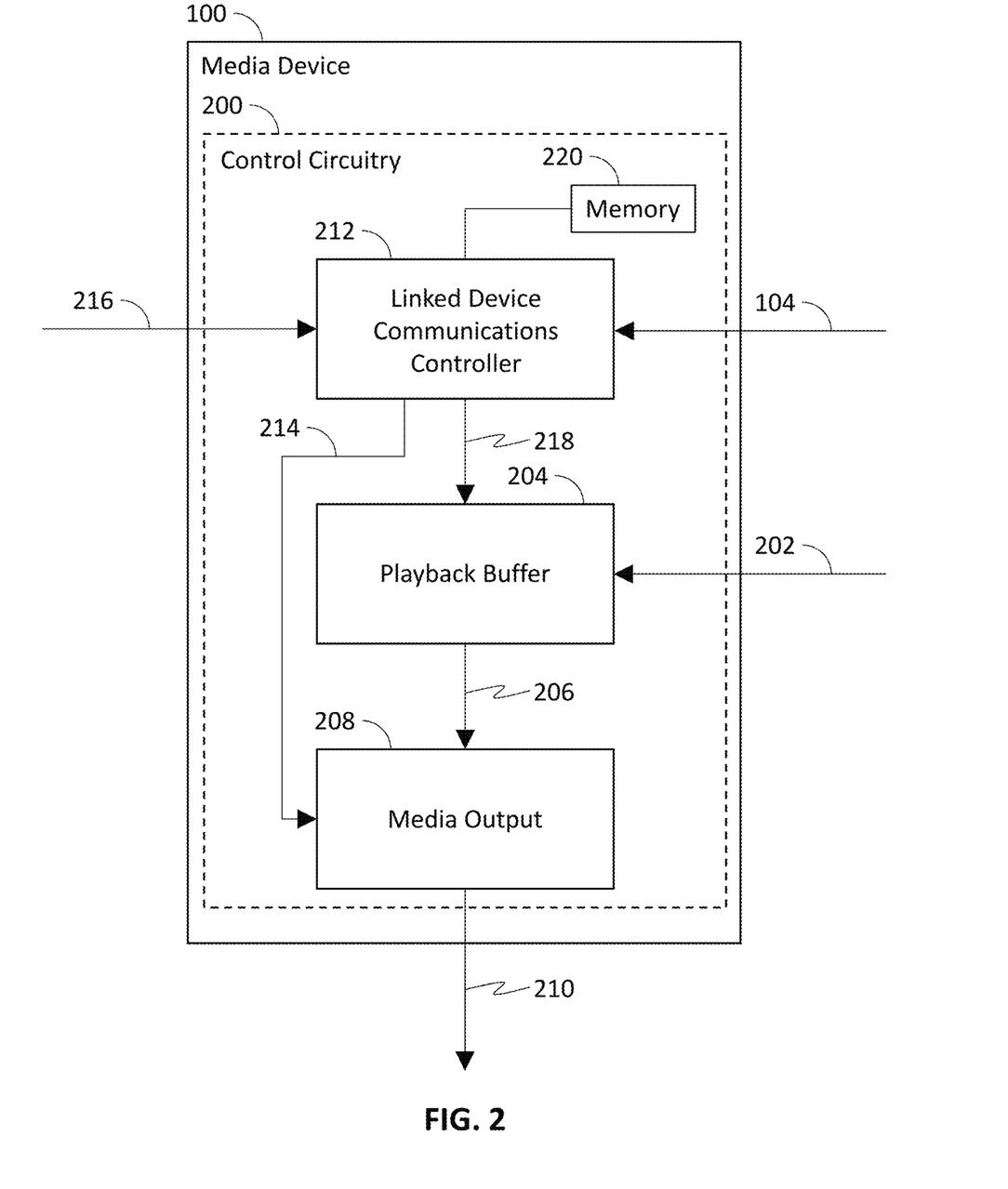
FIG. 2 is a block diagram representing a media device in accordance with some embodiments of the disclosure.

FIG. 2 is a block diagram of a media device in accordance with some embodiments of the disclosure. Media device 100 includes control circuitry 200. Control circuitry 200 may be based on any suitable processing circuitry and comprises control circuits and memory circuits which may be disposed on a single integrated circuit, or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Media device 100 may receive 202 a media asset at a playback buffer 204. The media asset may be a live broadcast, a streaming media asset, a locally stored media asset, or may be received from any suitable source using any suitable method or protocol for transferring media data.

As it is received at the playback buffer 204, media data of the media asset is processed and audio and video signals are generated and transmitted 206 to a media output 208, which in turn transmits 210 the audio and video signals to an integrated display (e.g., a touchscreen display panel of a tablet) or an external output device (e.g., a television). Playback buffer 204 may comprise video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided.

While outputting 210 the audio and video signals of the media asset, the media device 100 receives, at linked device communications controller 212, signal 104 from secondary device 102. Linked device communications controller 212 may include an Ethernet card, a wireless (e.g., IEEE 802.11a/b/g/n) modem for communications with other equipment, a Bluetooth transceiver, or any other suitable communications circuitry. Such communications may involve the Internet or any other suitable communications networks or paths. In addition, linked device communications controller 212 may include circuitry that enables peer-to-peer communication of user equipment devices, or communication of user equipment devices in locations remote from each other.

In response to receiving signal 104, control circuitry 200 (e.g., using linked device communications controller 212) generates for display a notification 106 of the signal 104. For example, the media device may generate an overlay for display over a currently playing media asset. The notification 106 may include an identification of the secondary device 102 and a status of the secondary device 102 corresponding to the current state of the secondary device 102. For example, the notification may identify an oven and the amount of time remaining on a timer set on the oven, or may identify a doorbell and indicate that someone has rung the bell. Linked device communications controller 212 transmits 214 the generated notification 106 to media output 208 for output.

In some embodiments, the signal 106 may comprise an audio component. For example, the signal may be a spoken message. In addition to outputting 210 notification 106 as an overlay, control circuitry 200 (e.g., using media output 208) may output the audio component. In order to allow the user to hear the audio component of the signal 106, control circuitry 200 (e.g., using media output 208) may mute an audio component of the media asset. Alternatively, control circuitry 200 (e.g., using media output 208) may blend the audio component of signal 106 with an audio component of the media asset, balancing volume levels of both audio components so that the audio component of the signal 106 is audible to, and comprehensible by, the user.

The media device 100 receives, e.g., at the linked device communications controller 212, input 216 from a user input device to interact with the displayed notification 106. For example, where the media device 100 is a tablet or mobile device, the user may interact with notification 106 using a touchscreen interface that is integrated into the media device 100 and communicates with control circuitry 200 of the media device 100 via the linked device communications controller 212. If the media device 100 is a set-top box, the user may interact with notification 106 using a remote control that communicates with control circuitry 200 of media device 100 via the linked device communications controller 212. In some embodiments, the user input device may be another IoT device or connected device, such as the user's mobile device, Amazon Echo, or Google Home, which communicates with control circuitry 200 of the media device 100 via linked device communications controller 212.

In response to receiving the input 216, control circuitry 200 stores a first time of receipt of the user input in a memory 220, which may be part of linked device communications controller 212, or may be a separate component of control circuitry 200. Memory may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Control circuitry 200 determines, after a threshold amount of time, whether the secondary device 102 is still in the second state. For example, the media device 100 may receive user input 216 to interact with notification 106 at 7:05:00 and stores that time. The threshold amount of time may be, for example, ten seconds. Control circuitry 200 may instantiate a timer process to count the threshold amount of time beginning at the stored time. Alternatively, control circuitry 200 may periodically compare a current time to the stored time to determine if the threshold amount of time has elapsed. If, at a second time of 7:05:10, the threshold amount of time after the stored time, control circuitry 200 determines that the secondary device 102 is still in the second state (i.e., someone is still waiting outside the door after ringing a smart doorbell), control circuitry 200 (e.g., using linked device communications controller 212) transmits a command 218 to playback buffer 204 to begin buffering the media asset.

In some embodiments, the media device 100 may pause playback of the media asset in response to receiving the user input to interact with the notification. For example, if a smart doorbell reports that someone has rung the bell, control circuitry 200 (e.g., using linked device communications controller 212) may transmit 218 a command to playback buffer 204 to pause playback of the media asset in order to allow the user to hear what the person at the door is saying.

When control circuitry 200 (e.g., using linked device communications controller 212) determines that the secondary device is no longer in the second state, control circuitry 200 may automatically resume playback of the media asset at the current playback position, or at a playback position corresponding to the time the user input 216 was received. In some embodiments, when control circuitry 200 (e.g., using linked device communications controller 212) determines that the secondary device is no longer in the second state, linked device communications controller 212 generates options for display relating to the playback of the media asset and transmits 214 the generated options to media output 208 for display. If playback buffer 204 has recorded a portion of the media asset, an option to restart playback of the media asset from the second time is generated. If playback buffer 204 has also paused playback of the media asset, an option to resume playback of the media asset at the current live point in the media asset is also generated.

In some embodiments, linked device communications controller 212 determines whether the secondary device 102 is still in the second state by monitoring transmissions from the user input device and determining if a transmission is addressed to the secondary device 102. For example, control circuitry 200 may detect (e.g., using linked device communications controller 212) data packets from the user input device and access a header of each packet to identify the destination of the packet. If any packet is addressed to the secondary device 102, control circuitry 200 determines that the user is still interacting with the secondary device 102 and, therefore, that the secondary device 102 is still in the second state.

In some embodiments, control circuitry 200 (e.g., using linked device communications controller 212) establishes a connection with the secondary device 102 and with the user input device. For example, the media device 100 may act as an IoT controller device and create a network including the media device 100, the secondary device 102, and the user input device. Linked device communications controller 212 receives the signal 104 from the secondary device 102 and the user input 216 from the user input device via the established connections. Linked device communications controller 212 may, in some embodiments, create a direct connection between the secondary device 102 and the user input device by bridging the established connections. Linked device communications controller 212 then relays data between the secondary device 102 and the user input device via the direct connection.

In some embodiments, control circuitry 200 receives, from the secondary device 102, audio and/or video data associated with the second state of the secondary device 102. For example, the secondary device 102 may be a smart doorbell, which may transmit audio and video captured from a microphone and camera of the smart doorbell to the media device. Control circuitry 200 (e.g., using linked device communications controller 212) transmits 214 the audio and/or video data received from the secondary device 102 to media output 208 for output.

Figure 3:
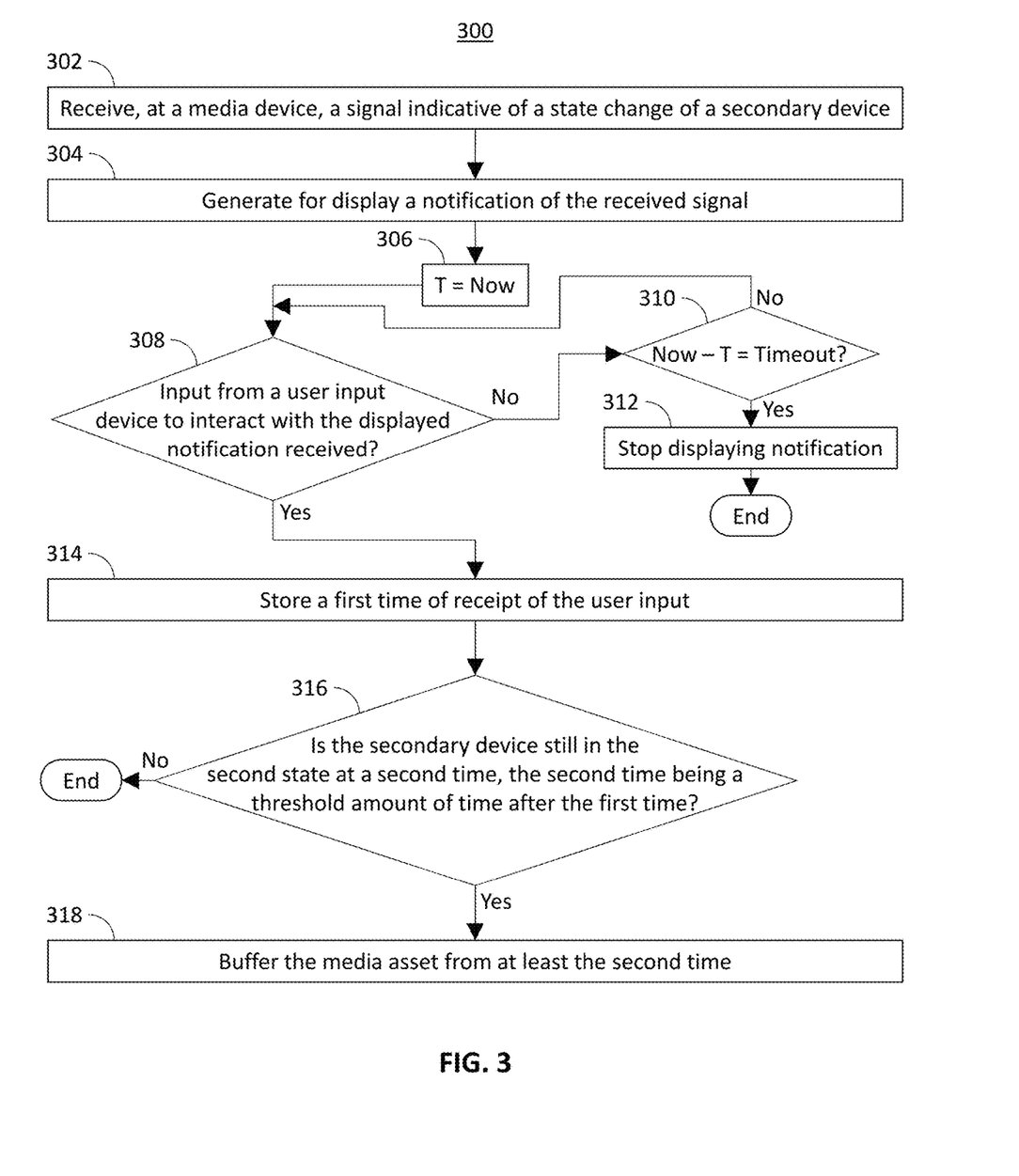
FIG. 3 is a flowchart representing a process for controlling playback or recording of a media asset in accordance with some embodiments of the disclosure.

FIG. 3 is a flowchart representing a process for controlling playback or recording of a media asset in accordance with some embodiments of the disclosure. The flowchart in FIG. 3 represents a process 300 implemented on control circuitry 200 for controlling playback or recording of a media asset according to an embodiment of the disclosure. One or more actions of process 300 may be incorporated into or combined with one or more actions of any other process or embodiment described herein.

At 302, control circuitry 200 receives a signal 104 indicative of a state change of a secondary device 102. For example, when someone rings the doorbell, the smart doorbell 102 transmits a signal 104 to the media device 100 indicating that the state of the doorbell has changed from idle to active. The signal 104 may also include an identification of the doorbell 102, and may optionally include audio and/or video data captured by a microphone and/or camera of the doorbell 102. The signal 104 is received by control circuitry 200 (e.g., using linked device communications controller 212).

At 304, control circuitry 200 (e.g., using linked device communications controller 212) generates for display a notification 106 of the received signal 104. For example, the media device may generate an overlay for display over a currently playing media asset. The notification 106 may include an identification of the secondary device 102 and a status of the secondary device 102 corresponding to the current state of the secondary device 102. For example, the notification may identify an oven and the current amount of time remaining on a timer set on the oven, or may identify a doorbell and indicate that someone has rung the bell. Linked device communications controller 212 transmits 214 the generated notification 106 to media output 208 for output.

At 306, control circuitry 200 sets a variable equal to the current time. For example, control circuitry 200 may retrieve the current system time from a remote time server, from the source of the media asset, or from a local real-time clock. Control circuitry 200 may convert the current time to an integer value, such as UTC time code, representing the number of seconds that have passed since Jan. 1, 1970.

At 308, control circuitry 200 determines whether user input to interact with the notification 106 has been received. For example, where the media device 100 is a tablet or mobile device, the user may interact with notification 106 using a touchscreen interface that is integrated into the media device 100 and communicates with control circuitry 200 via the linked device communications controller 212. Linked device communications controller 212 may determine whether the portion of the touchscreen where the user input was detected corresponds to the portion of the touchscreen in which notification 106 is displayed. If the media device 100 is a set-top box, the user may interact with notification 106 using a remote control which communicates with control circuitry 200 of media device 100 via the linked device communications controller 212. Linked device communications controller 212 may determine whether input received from the remote control corresponds to interaction with notification 106 by determining which key or keys were pressed on the remote control. In some embodiments, the user input device may be another IoT device or connected device, such as the user's mobile device, Amazon Echo, or Google Home, which communicates with control circuitry 200 of the media device 100 via linked device communications controller 212. Linked device communications controller 212 may process text or voice input from the connected device to determine if the input is for interacting with notification 106.

If user input to interact with the notification 106 has not been received, then, at 310, control circuitry 200 compares the difference between the current time and the time represented by the variable set at 306 to determine if a timeout threshold has been met. If the timeout threshold has not been met, then control circuitry 200 returns to step 308 to determine if input to interact with the notification has been received. If the timeout threshold has been met, then, at 312, control circuitry 200 stops displaying the notification 106.

Returning to 308, if input to interact with the notification 106 has been received, then, at 314, control circuitry 200 stores a first time of receipt of the input 216. Again, control circuitry 200 may retrieve the current system time from a remote time server, from the source of the media asset, or from a local real-time clock. Control circuitry 200 may convert the current time to an integer value, such as UTC time code, representing the number of seconds that have passed since Jan. 1, 1970.

At 316, control circuitry 200 determines whether the secondary device 102 is still in the second state at a second time that is a threshold amount of time after the time of receipt of the input 216. For example, control circuitry 200 may receive user input 216 to interact with notification 106 at 7:05:00 and stores that time. The threshold amount of time may be, for example, ten seconds. Control circuitry 200 may instantiate a timer process to count the threshold amount of time beginning at the stored time. Alternatively, control circuitry 200 may periodically compare a current time to the stored time to determine if the threshold amount of time has elapsed. An exemplary method of determining whether the secondary device 102 is still in the second state is described below in relation to FIG. 4.

If control circuitry 200 determines that, at the second time, the secondary device 102 is still in the second state, then, at 318, control circuitry 200 buffers the media asset from at least the second time. Continuing the example above, if, at a second time of 7:05:10, the threshold amount of time after the stored time, control circuitry 200 determines that the secondary device 102 is still in the second state (i.e., someone is still waiting outside the door after ringing a smart doorbell), control circuitry 200 (e.g., using linked device communications controller 212) transmits a command 218 to playback buffer 204 to begin buffering the media asset. In some embodiments, control circuitry 202 begins buffering the media asset from the time at which the user input 216 or signal 104 was received.

It is contemplated that the actions or descriptions of FIG. 3 may be used with any other embodiment of this disclosure. In addition, the actions and descriptions described in relation to FIG. 3 may be done in alternative orders or in parallel to further the purposes of this disclosure. For example, each of these actions may be performed in any order or in parallel or substantially simultaneously to reduce lag or increase speed of the system or method. Any of these actions may also be skipped or omitted from the process.

Figure 4:
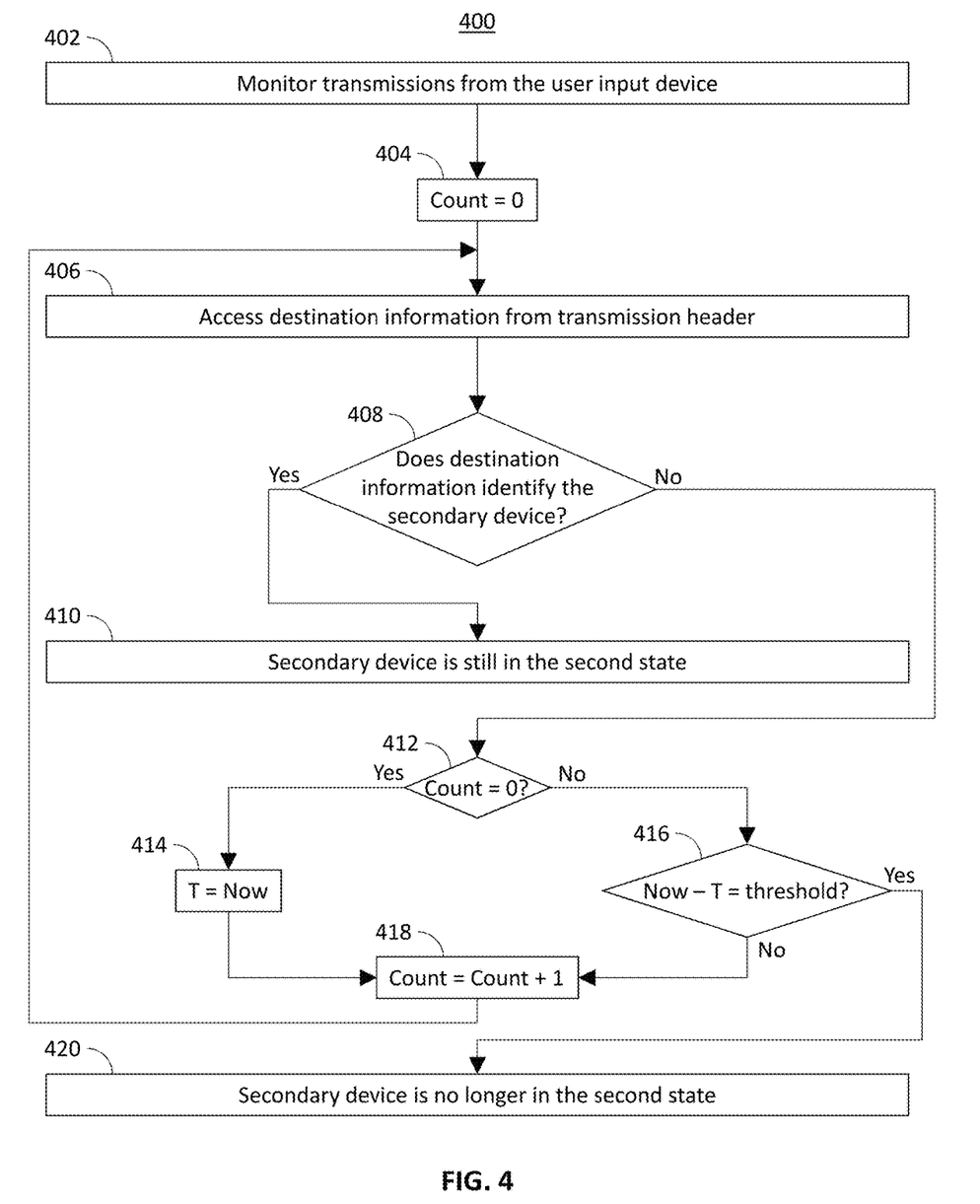
FIG. 4 is a flowchart representing a process for determining a secondary device is still in a particular state in accordance with some embodiments of the disclosure.

FIG. 4 is a flowchart representing a process for determining a secondary device is still in a particular state in accordance with some embodiments of the disclosure. The flowchart in FIG. 4 represents a process 400 implemented on control circuitry 200 for determining a secondary device is still in a particular state according to an embodiment of the disclosure. One or more actions of process 400 may be incorporated into or combined with one or more actions of any other process or embodiment described herein.

At 402, control circuitry 200 monitors transmissions from the user input device. For example, control circuitry 200 may detect (e.g., using linked device communications controller 212) data packets from the user input device.

At 404, control circuitry 200 instantiates a counter variable and sets the value of the counter variable to 0.

At 406, control circuitry 200 accesses destination information from the header of a transmission from the user input device. For example, control circuitry 200 (e.g., using linked device communications controller 212) may access a header of each packet detected at 402 to identify the destination of the packet.

At 408, control circuitry 200 determines if the destination information identifies the secondary device 102. For example, the header information may include routing information detailing the destination IP address or other identifier of the destination device. Control circuitry 200 (e.g., using linked device communications controller 212) may compare the identifier with a known identifier of the secondary device 102.

If the destination information identifies the secondary device 102, then, at 410, control circuitry 200 determines that the secondary device is still in the second state. For example, by determining that the user input device is transmitting data to the secondary device 102, control circuitry 200 may determine that the user is still interacting with the secondary device 102, and therefore determine that the secondary device 102 is still in the second state.

If the destination information does not identify the secondary device 102, then, at 412, control circuitry 200 determines whether the destination information is from the first transmission to be accessed. Control circuitry 200 accesses the counter variable and determines, based on the value of the counter variable, whether the current destination information is from the first packet to be accessed. If the counter variable has a value of 0, then control circuitry 200 will determine that the destination information is from the first packet to be accessed.

If the destination information is from the first transmission to be accessed, then, at 414, control circuitry 200 stores the current time in a variable. Control circuitry 200 may retrieve the current system time from a remote time server, from the source of the media asset, or from a local real-time clock. Control circuitry 200 may convert the current time to an integer value, such as UTC time code, representing the number of seconds that have passed since Jan. 1, 1970.

If the destination information is not from the first transmission to be accessed, then, at 416, control circuitry 200 determines if a threshold amount of time has passed since the time stored at 414. Control circuitry 200 may access the variable set at 414 and compare the difference between the value of the variable and the current time to the threshold amount of time.

If the threshold amount of time has not passed, then, at 418, control circuitry 200 increments the value of the counter variable and returns to 406 to access the destination information from another transmission header. If the threshold amount of time has passed, then, at 420, control circuitry 200 determines that the secondary device 102 is no longer in the second state. Similar to the determination made at 410, control circuitry 200 may determine that the user is no longer interacting with the notification and therefore determine that the secondary device 102 is no longer in the second state.

It is contemplated that the actions or descriptions of FIG. 4 may be used with any other embodiment of this disclosure. In addition, the actions and descriptions described in relation to FIG. 4 may be done in alternative orders or in parallel to further the purposes of this disclosure. For example, each of these actions may be performed in any order or in parallel or substantially simultaneously to reduce lag or increase speed of the system or method. Any of these actions may also be skipped or omitted from the process.

Figure 5:
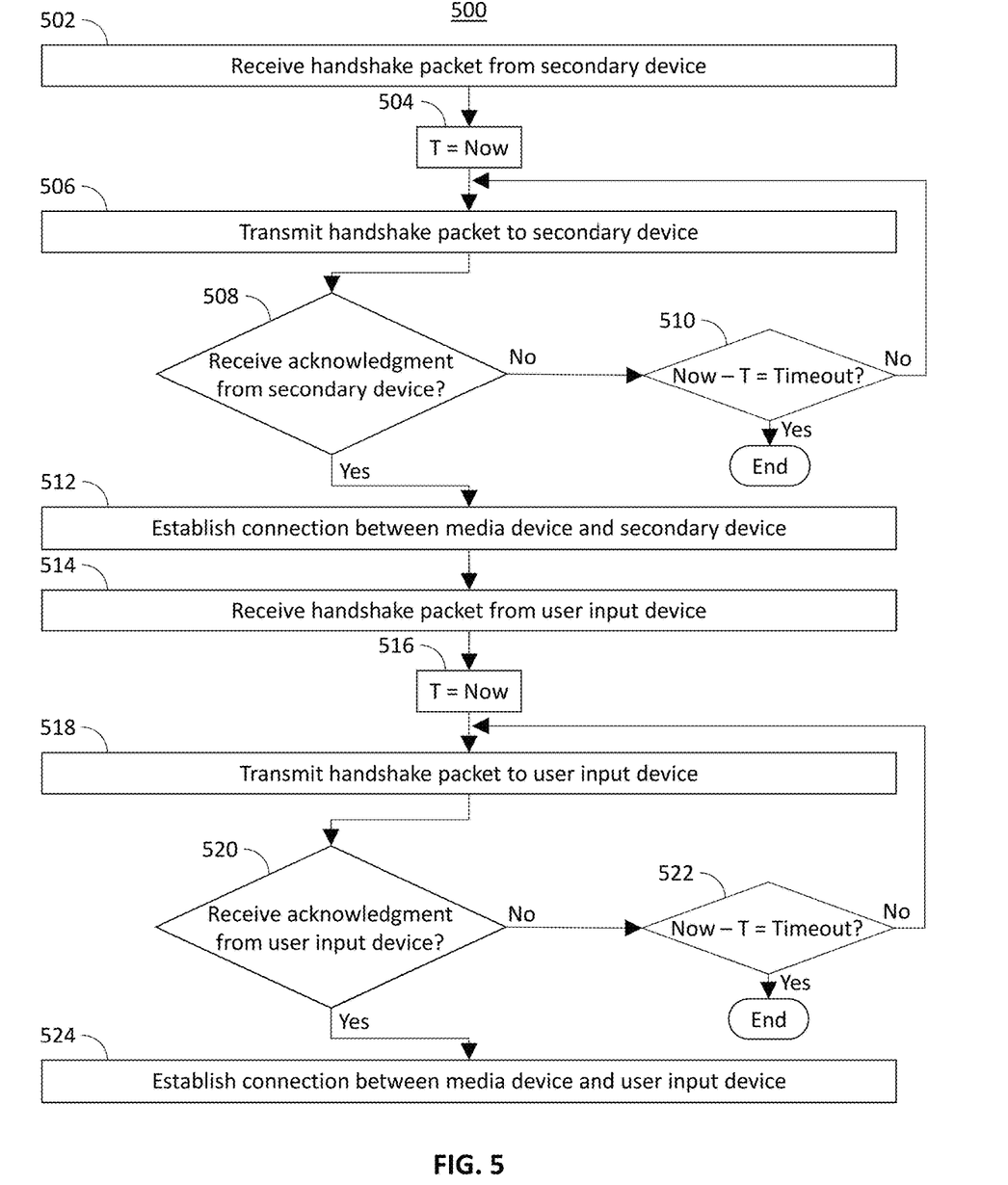
FIG. 5 is a flowchart representing a process for establishing connections between a media device and a secondary device and between a media device and a user input device in accordance with some embodiments of the disclosure.

FIG. 5 is a flowchart representing a process for establishing connections between a media device and a secondary device and between a media device and a user input device in accordance with some embodiments of the disclosure. The flowchart in FIG. 5 represents a process 500 implemented on control circuitry 200 for establishing connections between a media device and a secondary device and between a media device and a user input device according to an embodiment of the disclosure. One or more actions of process 500 may be incorporated into or combined with one or more actions of any other process or embodiment described herein.

At 502, control circuitry 200 (e.g., using linked device communications controller 212) receives a handshake packet from secondary device 102. For example, secondary device 102 may transmit a synchronization packet (SYN) to media device 100.

At 504, control circuitry 200 stores the current time in a variable. Control circuitry 200 may retrieve the current system time from a remote time server, from the source of the media asset, or from a local real-time clock. Control circuitry 200 may convert the current time to an integer value, such as UTC time code, representing the number of seconds that have passed since Jan. 1, 1970.

At 506, control circuitry 200 (e.g., using linked device communications controller 212) transmits a handshake packet to secondary device 102 in response to the received handshake packet. For example, control circuitry 200 may transmit a combined acknowledgement and synchronization packets (SYN-ACK) to the secondary device 102.

At 508, control circuitry 200 determines whether an acknowledgement (ACK) of the SYN-ACK packet has been received from the secondary device 102. If no ACK has been received, then, at 510, control circuitry 200 may determine if a timeout threshold has been reached by comparing the current time to the time stored in the variable at 504. If the timeout threshold has not been reached, control circuitry 200 returns to 506 and transmits another SYN-ACK packet to the secondary device 102. If the timeout threshold has been reached, the connection process is aborted. If an ACK has been received, then, at 512, control circuitry 200 establishes a connection between the media device 100 and the secondary device 102.

At 514, control circuitry 200 (e.g., using linked device communications controller 212) receives a handshake packet from the user input device. For example, as with the secondary device 102, the user input device may transmit a synchronization packet (SYN) to media device 100.

At 516, control circuitry 200 stores the current time in a variable. As above, control circuitry 200 may retrieve the current system time from a remote time server, from the source of the media asset, or from a local real-time clock. Control circuitry 200 may convert the current time to an integer value, such as UTC time code, representing the number of seconds that have passed since Jan. 1, 1970.

At 518, control circuitry 200 (e.g., using linked device communications controller 212) transmits a handshake packet to the user input device in response to the received handshake packet. For example, as with the secondary device 102, control circuitry 200 may transmit a combined acknowledgement and synchronization packets (SYN-ACK) to the user input device.

At 520, control circuitry 200 determines whether an acknowledgement (ACK) of the SYN-ACK packet has been received from the user input device. If no ACK has been received, then, at 522, control circuitry 200 may determine if a timeout threshold has been reached by comparing the current time to the time stored in the variable at 516. If the timeout threshold has not been reached, control circuitry 200 returns to 518 and transmits another SYN-ACK packet to the user input device. If the timeout threshold has been reached, the connection process is aborted. If an ACK has been received, then, at 524, control circuitry 200 establishes a connection between the media device 100 and the user input device.

It is contemplated that the actions or descriptions of FIG. 5 may be used with any other embodiment of this disclosure. In addition, the actions and descriptions described in relation to FIG. 5 may be done in alternative orders or in parallel to further the purposes of this disclosure. For example, each of these actions may be performed in any order or in parallel or substantially simultaneously to reduce lag or increase speed of the system or method. Any of these actions may also be skipped or omitted from the process.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for establishing a communication path between devices in an Internet-of-Things (IoT) environment, the method comprising:
   detecting that a state of an IoT device has changed from a first state to a second state;
   receiving, at a first device, a data packet from a second device while the state of the IoT device is in the second state;
   determining, at the first device, that the data packet is addressed to the IoT device; and
   in response to determining, at the first device, that the data packet is addressed to the IoT device, establishing, via the first device, a communication path communicatively coupling the second device and the IoT device.

2. The method of claim 1, wherein the first device is an IoT controller device.

3. The method of claim 1, wherein establishing the communication path comprises:
   connecting the first device and the IoT device via a first connection; and
   connecting the first device and the second device via a second connection.

4. The method of claim 3, further comprising:
   bridging the first connection and the second connection to form a direct connection between the IoT device and the second device; and
   transmitting one or more communication packets between the IoT device and the second device via the direct connection.

5. The method of claim 1, further comprising transmitting media data from the IoT device via the communication path, wherein the media data is associated with the second state and comprises at least one of audio data or video data captured via the IoT device.

6. The method of claim 1, further comprising:
   requesting an acknowledgment from at least one of the IoT device or the second device; and
   in response to receiving the acknowledgment before reaching a timeout threshold, establishing the communication path.

7. The method of claim 1, wherein determining that the data packet is addressed to the IoT device comprises:
   accessing destination information of the data packet; and
   determining whether the destination information identifies the IoT device as a destination of the data packet.

8. The method of claim 1, wherein the first device is currently presenting a media asset, the method further comprising, in response to detecting that the state has changed to the second state, buffering the media asset.

9. The method of claim 1, further comprising transmitting the data packet from the second device to the IoT device via the communication path.

10. The method of claim 1, wherein the IoT device is a smart home device, and wherein the second device is a smart home hub.

11. A system for establishing a communication path between devices in an Internet-of-Things (IoT) environment, the system comprising:
   communications circuitry configured to establish the communication path between two or more devices; and
   control circuitry configured to:
   detect that a state of an IoT device has changed from a first state to a second state;

receive, at a first device, a data packet from a second device while the state of the IoT device is in the second state;

determine, at the first device, that the data packet is addressed to the IoT device; and in response to determining, at the first device, that the data packet is addressed to the IoT device, establish, via the first device using the communications circuitry, a communication path communicatively coupling the second device and the IoT device.

12. The system of claim 11, wherein the first device is an IoT controller device.

13. The system of claim 11, wherein the control circuitry, when establishing the communication path, is configured to:
connect, via the communications circuitry, the first device and the IoT device via a first connection; and
connect, via the communications circuitry, the first device and the second device via a second connection.

14. The system of claim 13, wherein the control circuitry is further configured to:
bridge the first connection and the second connection to form a direct connection between the IoT device and the second device; and
transmit one or more communication packets between the IoT device and the second device via the direct connection.

15. The system of claim 11, wherein the control circuitry is further configured to transmit media data from the IoT device via the communication path, wherein the media data is associated with the second state and comprises at least one of audio data or video data captured via the IoT device.

16. The system of claim 11, wherein the control circuitry is further configured to:
request an acknowledgment from at least one of the IoT device or the second device; and
in response to receiving the acknowledgment before reaching a timeout threshold, establish the communication path.

17. The system of claim 11, wherein the control circuitry, when determining that the data packet is addressed to the IoT device, is configured to:
access destination information of the data packet; and
determine whether the destination information identifies the IoT device as a destination of the data packet.

18. The system of claim 11, wherein the first device is currently presenting a media asset, and wherein the control circuitry is further configured to, in response to detecting that the state has changed to the second state, buffer the media asset.

19. The system of claim 11, wherein the control circuitry is further configured to transmit the data packet from the second device to the IoT device via the communication path.

20. The system of claim 11, wherein the IoT device is a smart home device, and wherein the second device is a smart home hub.

* * * * *